(12) United States Patent
Robert (10) Patent No.: US 11,467,272 B2
(45) Date of Patent: Oct. 11, 2022

(54) COMPRESSIVE SENSING IN FORMING ULTRASOUND IMAGES

(71) Applicant: KONINKLIJKE PHILIPS N.V., Eindhoven (NL)

(72) Inventor: Jean-Luc Robert, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 551 days.

(21) Appl. No.: 15/522,807

(22) PCT Filed: Oct. 30, 2015

(86) PCT No.: PCT/IB2015/058378
§ 371 (c)(1),
(2) Date: Apr. 28, 2017

(87) PCT Pub. No.: WO2016/067253
PCT Pub. Date: May 6, 2016

(65) Prior Publication Data
US 2017/0336501 A1    Nov. 23, 2017

Related U.S. Application Data

(60) Provisional application No. 62/072,801, filed on Oct. 30, 2014.

(51) Int. Cl.
*G03B 42/06* (2021.01)
*G01S 7/52* (2006.01)
*G01S 15/89* (2006.01)

(52) U.S. Cl.
CPC ...... *G01S 7/52025* (2013.01); *G01S 7/52034* (2013.01); *G01S 7/52085* (2013.01); *G01S 7/52095* (2013.01); *G01S 15/8915* (2013.01)

(58) Field of Classification Search
None
See application file for complete search history.

(56) References Cited

U.S. PATENT DOCUMENTS 4,159,462 A * 6/1979 Rocha ................. G01S 7/52026
367/105
4,387,597 A * 6/1983 Brandestini ......... G01S 7/52063
73/626

(Continued)

FOREIGN PATENT DOCUMENTS

CN    102279394 A    12/2011
CN    102288968 A    12/2011

(Continued)

OTHER PUBLICATIONS

Chen, George H., Christian Wachinger, and Polina Golland. "Sparse projections of medical images onto manifolds." International Conference on Information Processing in Medical Imaging. Springer, Berlin, Heidelberg, 2013. (Year: 2013).*

(Continued)

*Primary Examiner* — Isam A Alsomiri
*Assistant Examiner* — Jonathan D Armstrong (57) ABSTRACT

In an image compressing ultrasound system, for generating an imaging sample, delays are applied transducer-element-wise to respective time samples. The delayed samples are summed coherently in time, the coherently summed delays being collectively non-focused. An image is sparsified based on imaging samples and, otherwise than merely via said imaging samples, on angles (236) upon which respectively the delays for the generating of the imaging samples are functionally dependent. An image-compressing processor (120) may minimize a first p-norm of a first matrix which is a product of two matrices the content of one representing the image in a compression basis. The minimizing is subject to a constraint that a second p-norm of a difference between a (Continued)

measurement matrix and a product of an image-to-measurement-basis transformation matrix, an image representation dictionary matrix, and the matrix representing the image in the compression basis does not exceed an allowed-error threshold. The measurement matrix is populated either by channel data, or by output of a Hilbert transform applied to the channel data in a time dimension.

19 Claims, 6 Drawing Sheets

(56) References Cited

U.S. PATENT DOCUMENTS

| | | | | |
|---|---|---|---|---|
| 4,827,268 | A * | 5/1989 | Rosen | H01Q 3/40 |
| | | | | 342/368 |
| 5,924,986 | A * | 7/1999 | Chandler | A61B 5/0806 |
| | | | | 600/407 |
| 6,527,720 | B1 * | 3/2003 | Ustuner | A61B 8/0858 |
| | | | | 600/443 |
| 6,783,497 | B2 * | 8/2004 | Grenon | A61B 8/12 |
| | | | | 310/320 |
| 9,268,015 | B2 * | 2/2016 | Rothberg | A61N 7/00 |
| 9,536,045 | B1 * | 1/2017 | Fram | G16H 30/20 |
| 2004/0054281 | A1 * | 3/2004 | Adam | A61B 8/587 |
| | | | | 600/437 |
| 2005/0228279 | A1 * | 10/2005 | Ustuner | G01S 7/52049 |
| | | | | 600/443 |
| 2006/0173334 | A1 * | 8/2006 | Azuma | A61B 8/00 |
| | | | | 600/447 |
| 2007/0161904 | A1 * | 7/2007 | Urbano | A61B 8/00 |
| | | | | 600/459 |
| 2007/0242567 | A1 * | 10/2007 | Daft | A61B 8/12 |
| | | | | 367/140 |
| 2008/0050047 | A1 * | 2/2008 | Bashyam | G06T 9/00 |
| | | | | 382/305 |
| 2008/0110263 | A1 * | 5/2008 | Klessel | G01S 7/52028 |
| | | | | 73/602 |
| 2010/0128958 | A1 | 5/2010 | Chen et al. | |
| 2011/0129118 | A1 * | 6/2011 | Hagbi | G06T 19/006 |
| | | | | 382/103 |
| 2011/0182353 | A1 | 7/2011 | Bae | |
| 2011/0273320 | A1 | 11/2011 | Nogueira | |
| 2013/0226509 | A1 | 8/2013 | Boufounos | |
| 2014/0037199 | A1 | 2/2014 | Aharon et al. | |
| 2014/0140375 | A1 | 5/2014 | Muqaibel et al. | |
| 2014/0177384 | A1 | 6/2014 | Boufounos | |
| 2014/0180176 | A1 * | 6/2014 | Rothberg | A61N 7/00 |
| | | | | 601/3 |
| 2014/0231620 | A1 * | 8/2014 | Oike | H04N 5/335 |
| | | | | 250/208.1 |
| 2015/0224346 | A1 * | 8/2015 | Coviello | A61B 8/4494 |
| | | | | 600/439 |
| 2016/0328643 | A1 * | 11/2016 | Liu | G06N 3/084 |
| 2017/0041021 | A1 * | 2/2017 | Karkkainen | H03M 7/3084 |
| 2017/0336501 | A1 * | 11/2017 | Robert | G01S 15/8915 |
| 2019/0096419 | A1 * | 3/2019 | Giacobello | G10L 21/02 |
| 2019/0137601 | A1 * | 5/2019 | Driscoll | G01S 13/42 |
| 2019/0265353 | A1 * | 8/2019 | Jones | G01S 15/8915 |

FOREIGN PATENT DOCUMENTS

| | | | | |
|---|---|---|---|---|
| CN | 102640012 A | | 8/2012 | |
| EP | 1952175 B1 * | | 1/2013 | G01S 15/8956 |
| JP | 2006231547 A | | 9/2006 | |
| JP | 2012509722 A | | 4/2012 | |
| JP | 2013174584 A | | 9/2013 | |
| JP | 2014122881 A | | 7/2014 | |
| JP | 2014122883 A | | 7/2014 | |
| JP | 2014129303 A | | 7/2014 | |
| WO | 2011041581 A1 | | 4/2011 | |

OTHER PUBLICATIONS

Schiffner, Martin F., and Georg Schmitz. "Fast pulse-echo ultrasound imaging employing compressive sensing." 2011 IEEE International Ultrasonics Symposium. IEEE, 2011. (Year: 2011).*
Hua, Shaoyan, Mingyue Ding, and Ming Yuchi. "Sparse-view ultrasound diffraction tomography using compressed sensing with nonuniform FFT." Computational and mathematical methods in medicine 2014 (2014). (Year: 2014).*
Schiffner et al "Compensating the Combined Effects of Absorption and Dispersion in Plane Wave Pulse Echo Ultrasound Imaging Using Sparse Recovery" Proceedings of the 2013 IEEE Prague, CZ.
Hervé Liebgott et al:"Pre-beamformed RF signal reconstruction in medical ultrasound using compressive sensing", Ultrasonics, vol. 53, No. 2, Feb. 1, 2013 (Feb. 1, 2013), pp. 525-533.
Bernard Olivier et al: "Ultrasound Fourier slice imaging: a novel approach for ultrafast imaging technique", 2014 IEEE International Ultrasonics Symposium,Sep. 3, 2014 (Sep. 3, 2014), pp. 129-132.
Carrill0 Rafael E et al: "A Sparse regularization approach for ultrafast ultrasound imaging".2015 IEEE International Ultrasonics Symposium (US),Oct. 24, 2015 (Oct. 24, 2015), pp. 1-4.
"Secret image sharing based on compressed sensing", (translation included), 10 pages (Abstract).

* cited by examiner

FIG. 3C $$||MVX-Y|| < E$$
404, 408, 412, 416, 420

FIG. 4A

$$\frac{\delta\left(t_j - \frac{z_l}{c} - \frac{||r_{kl}-r_i||}{c}\right)}{2\pi ||r_{kl}-r_i||}$$

FIG. 4B

$$\exp(-i * 2\pi/\lambda_j * (z_l + z_l.\cos(\theta_i) + X_k.\sin(\theta_i)))$$  424

FIG. 4C

$$\delta\left(t_j - \frac{z_i}{c} - \frac{z_l.\cos(\theta_i) + X_k.\sin(\theta_i)}{c}\right)$$  428

FIG. 4D

$$\delta\left(t_j - 2 * \frac{z_i}{c}\right) \text{sinc}\left(\frac{(X_i - X_k) * D}{\lambda_0 * z_l}\right)$$

FIG. 4E

$$\exp(-i * 2\pi * (f_{zi}, z_l + f_{xj} X_k))$$

FIG. 4F

COMPRESSIVE SENSING IN FORMING ULTRASOUND IMAGES

This application is the U.S. National Phase application under 35 U.S.C. § 371 of International Application No. PCT/IB2015/058378, filed on Oct. 30, 2015, which claims the benefit of Provisional Application Ser. No. 62/072,801, filed Oct. 30, 2014. These applications are hereby incorporated by reference herein.

FIELD OF THE INVENTION

The present invention relates to ultrasound image sampling and, more particularly, to compressive sensing.

BACKGROUND OF THE INVENTION

Over the past decade, Compressive Sensing (CS) has gained a lot of visibility and recognition from the signal processing community. CS is used in various domains, such as magnetic resonance imaging (MRI), and is a non-linear reconstruction method that uses a priori information on the signal, such as the imaged medium, to achieve a high quality reconstruction with less measurement. An example of CS using ultrasound is provided in Schiffner et al., "Compensating the Combined Effects of Absorption and Dispersion in Plane Wave Pulse-Echo Ultrasound Imaging Using Sparse Recovery" Proceedings of the 2013 IEEE IUS, Prague, Czech Republic.

SUMMARY OF THE INVENTION

In an aspect of what is proposed herein, in an ultrasound imaging system there is provided image-sample-acquisition circuitry. For generating an imaging sample, delays are applied transducer-element-wise. Time samples are, according to the delays, summed coherently in time, the coherently summed delays being collectively non-focused. A compressive sensing (CS) processor sparsifies, i.e., makes more sparse, an image. For this, a basis is used in which the image has a sparse representation, or, if not sparse, compressible. An image which is sparse is inherently compressible. However, more generally, even an image that is not sparse in a basis will be referred to herein below as compressible in that basis if the image's coefficients, ordered by magnitude, in that basis decay relatively quickly. Thresholds of normalized magnitude and coefficient counts are usable in defining the criterion. The sparsifying is performed based on imaging samples generated as described herein above and, otherwise than merely via said imaging samples, on angles upon which respectively the delays for the generating of the imaging samples are functionally dependent. Focusing on field points is achieved by the CS.

In another aspect, an ultrasound image-compressing apparatus includes an ultrasound imaging array having transducer elements that are communicatively connected to respective data channels. The array is operable to generate, on the channels, time-domain channel data representative of an image. Further included in the apparatus is an image-compressing processor for minimizing a first p-norm of a first matrix which is a product of two matrices the content of one representing the image in a compression basis. The minimizing is subject to a constraint that a second p-norm of a difference between a measurement matrix and a product of an image-to-measurement-basis transformation matrix, an image representation dictionary matrix, and the matrix representing the image in a compression basis does not exceed an allowed-error threshold. The measurement matrix is populated either by channel data, or by output of a Hilbert transform applied to the channel data in a time dimension. Here, p is different or the same for the first and second p-norms.

Details of the novel imaging technology are set forth further below, with the aid of the following drawings, which are not drawn to scale.

DETAILED DESCRIPTION OF EMBODIMENTS

Figure 1:
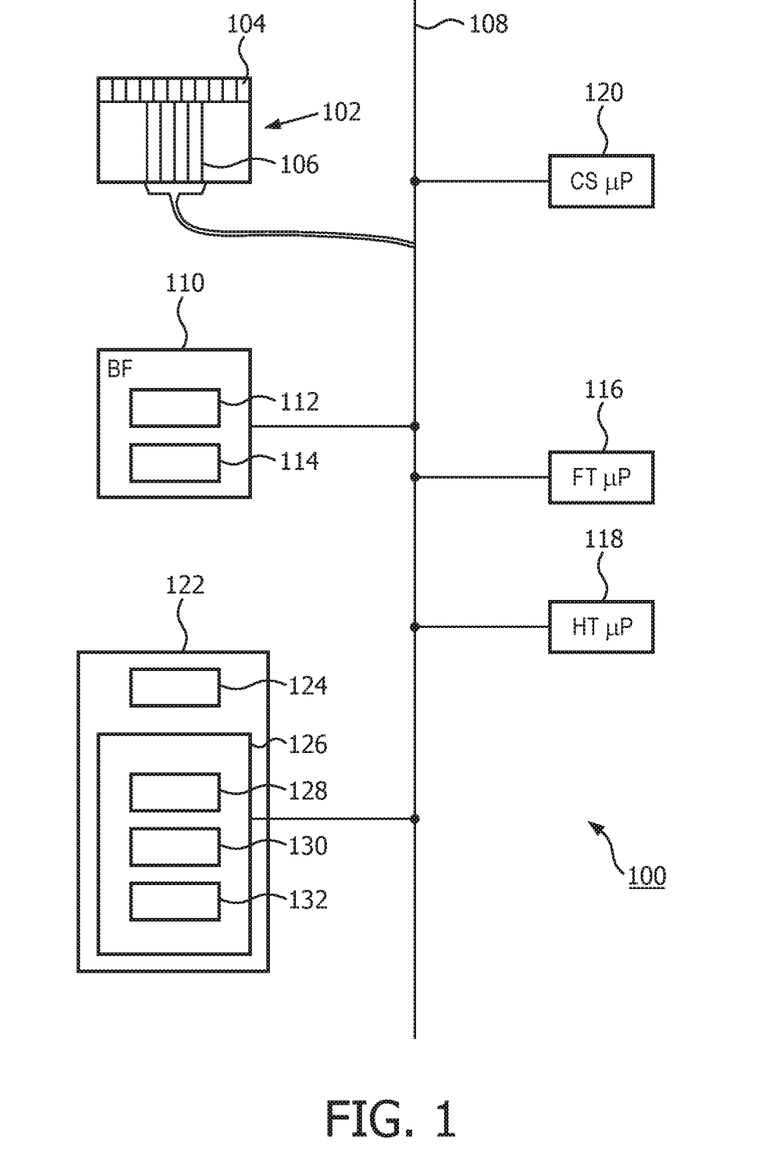
FIG. 1 is a schematic diagram of one example of an ultrasound imaging apparatus, in accordance with the present invention.

FIG. 1 depicts, by way of illustrative and non-limitative example, an ultrasound imaging apparatus 100 for compressing an image. The apparatus 100 includes an array 102, which is for example one-dimensional, comprising transducer elements 104, e.g., 128 of them, communicatively connected to respective data channels 106. For what is proposed herein, the use of a 2D matrix array is an alternative. The channels are communicatively connected, by wireline or wirelessly, as by a port (not shown), to a communication medium 108, such as a data bus. A beamformer 110 having both transmit and receive functionality includes a timer, or clock, 112 and a summing unit, or adder, 114. The beamformer 110 on receive sums, in a temporally coherent manner, appropriately-delayed time samples on the channels 106 to generate an imaging sample. The imaging sample is referred to herein as a beamformed sample, although in some embodiments, the delays do not focus. This process is repeated over and over to form beamformed samples that span the depth of the image being acquired. The beamformed samples are later used to reconstruct the image acquired. Hereinafter, the term "beamformed sample" will, unless otherwise indicated, refer to an unfocused beamformed sample, such that the delays for creating the sample are unfocused and the beamforming to create the sample is unfocused. The apparatus 100 further includes microprocessors 116, 118, 120, for respectively Fourier transform, Hilbert transform, and compressive sensing (CS) processing. Also included is storage memory 122. This includes permanent memory 124, such as read-only memory (ROM) for logic, and temporary memory 126, such as random access memory (RAM) for data. The temporary memory 126 includes storage in the form of a time samples buffer 128 and a beamformed samples buffer 130. It also includes a frame buffer 132 which may receive either the time samples, the beamformed samples, or both. Processing in the ultrasound imaging apparatus 100 can be implemented with any combination of software, hardware, and firmware.

Figure 2:
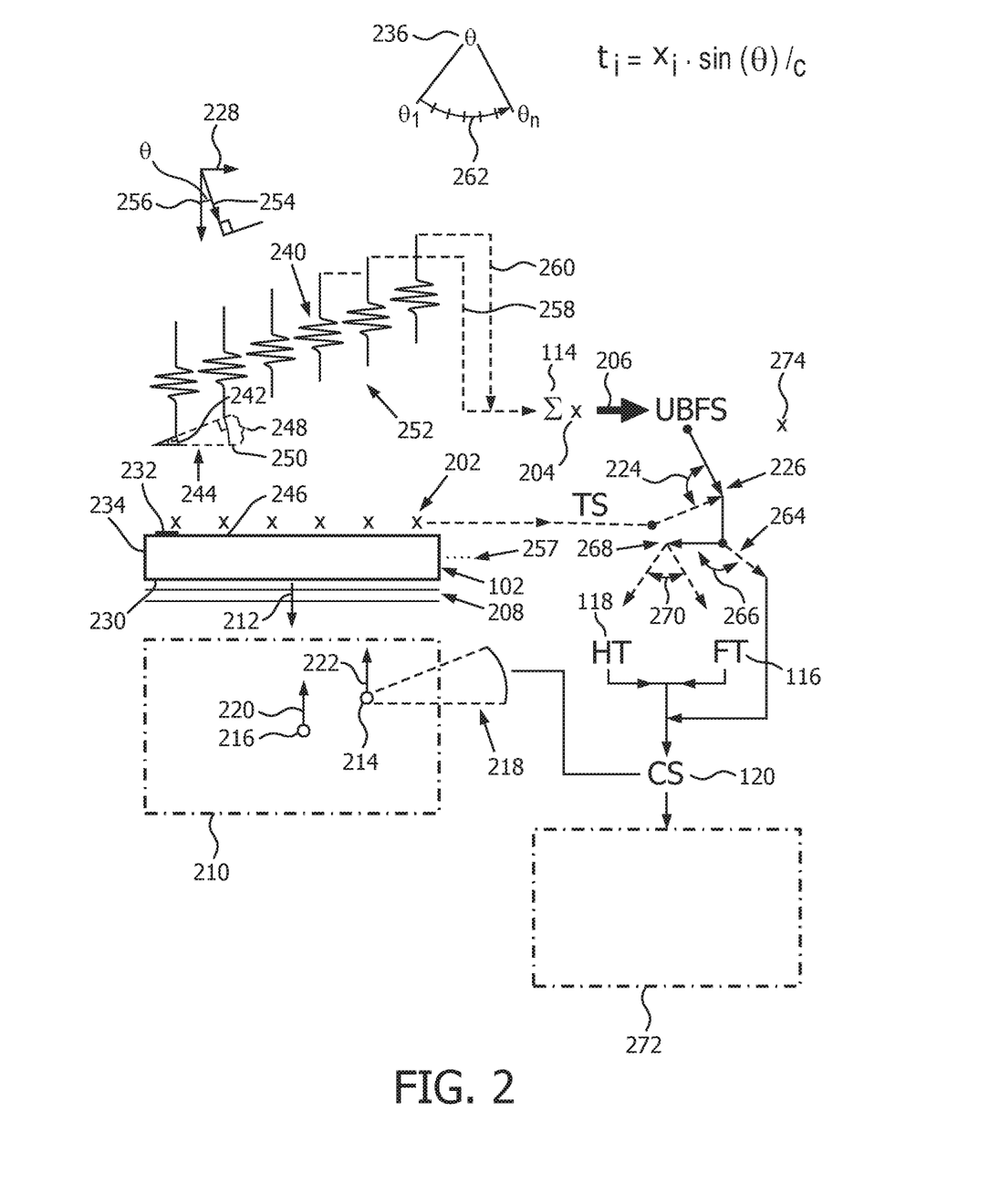
FIG. 2 is a conceptual, overview diagram exemplary of, and pertaining to, the apparatus of FIG. 1.

FIG. 2 provides an exemplary overview of how the compressive sensing may be implemented. There are a number of different designs, or alternatively modes of operation. The CS processor 120 can operate on raw, radiofrequency time samples 202, a stream of which is symbolized by "TS" in FIG. 2. It can also or alternatively be configured to operate on unfocused beamformed samples 204, symbolized in FIG. 2 by "UBFS." A stream of UBFS samples flows from the adder 114 as indicated by the arrow 206 in FIG. 2.

Initially, an unfocused transmit pulse, or "transmit", 208 is issued, by the array 102, toward a medium 210, as represented by the arrow 212 in that direction. In the current example, the unfocused transmit 208 is such as to generate a plane wave. Any other kind of unfocused transmit 208, such as a diverging one, is within the intended scope of what is proposed herein. By using a single transmit 208 to cover the whole medium 210 within the field of view (FOV), the imaging frame rate can be elevated. Accordingly, patient exposure time and procedure time are lessened.

In the instant example, it is point-like scatterers 214, 216 in the medium 210 that are being imaged. Some advantages afforded by the CS are, as mentioned herein, an increased frame rate due to fewer transmits 208. Sampling, which is discussed below, need not strictly adhere to the Nyquist-Shannon sampling rate and instead may dip below while still maintaining or even increasing image quality, even in the case of a medical image used for clinical diagnosis or treatment. Also, as discussed further below, the acquired image may be sparsified or, more generally, compressed, thereby taking up less storage. To afford these potential advantages, CS uses a priori information which is knowledge of the basis in which the image has a compressible representation. In FIG. 2 and by way of example, part of the a priori information is that it is the point-like scatterers, e.g., contrast agent microbubbles, in the medium that are being imaged. CS works well under the current a priori assumptions, because the image basis is the pixel basis and, in the pixel basis, the image scatterers if, not sufficiently numerous, are sparse. For other, more useful, clinical images, an image basis other than the pixel basis can be selected in which the signal is sparse or compressible. Such a more complex basis can be based on wavelets, curvelets, wave atoms, laplacians, etc. For this more complex basis, an image basis transformation, "or image representation dictionary", matrix V, together with a transformation matrix M, or "image-to-measurement-basis transformation matrix", would provide the transformation from the compression basis to the measurement basis, i.e., to the measurement matrix Y. More generally, either M alone or a product of M and V can be referred to as a compression-to-measurement-basis transformation matrix. The best basis in terms of sparsity or compressibility could be learned from a collection of similar images (for example cardiac images) using algorithms such as K-SVD. This algorithm is described in U.S. Patent Publication 2014/0037199, (hereinafter "the '199 publication") the disclosure of which pertaining to K-SVD, beginning in paragraph [0073] and FIG. 1, is incorporated herein by reference.

Referring again to FIG. 2, CS, rather than the beamforming delays, is what provides the focusing 218 on the field points, here point scatterers 214, 216.

An echo returning from the field points 214, 216, that return represented in FIG. 2 by the arrows 220, 222, is sensed via the transducer elements 104 of the array 102. Sampling, by the apparatus 100, creates the time samples 202.

A stream of the time samples 202 is read or forwarded for processing as mentioned herein above.

However, in an alternative or additional implementation or mode of operation, the unfocused beamformed samples 204 are generated based on the time samples 202, and read, or forwarded as a stream, for processing.

The alternative nature is represented in FIG. 2 by the curved, two-headed, stream-selection arrow 224. In one throw of a first switch 226, UBFS is selected. In the other throw, TS is selected.

Beamforming delays in, as described below, a "plane wave receive" mode or implementation, are computed according to the definition $t_i=x_i+\sin(\Theta)/c$. The delay applied to channel i is denoted $t_1$. In the current example, each transducer element 104 corresponds one-to-one with a channel 106. Each element 104 has a respective position $x_i$ in the lateral direction denoted in FIG. 2 by the directional arrow 228. For example, a particular element 230 occupies a lateral position having a magnitude 232 represented in FIG. 2 by that of a line segment. As another example, for another element 234, $x_i$ is equal to zero. Alternatively, the index i=0 could be allocated to the central element of the array 102, in which case indices on one side would be negative and, on the other side, positive.

In the definition $t_i=x_i+\sin(\Theta)/c$, the angle $\Theta$ can be analogized to a plane wave angle 236, for a "plane wave" on receive, even though the wavefronts coming back from scatterers are not straight-line. The letter "c" in the definition refers to propagation speed in the medium 210, here the propagation being that of ultrasound. For a hypothetical straight-line wavefront on receive, i.e., an incoming plane wave at an angle, the delays in the definition are usable to "remove" the angle of incidence. FIG. 2 conceptually depicts the plane wave angle $\Theta$, denoted angle 236, by the arrangement of delay symbols 240. For the aforementioned lateral position 232, the delay is the magnitude 242 of the respective line segment. Likewise, for a lateral position 244 of another transducer element 246, the delay to be applied is the magnitude 248 of the corresponding line segment. The array 102 has an ultrasound-communicating face 134, and the magnitudes 242, 248 are deviations from the face, as if the line segment 250 were to be placed on the face. Accordingly, a spatial pattern 252 of deviations, from one of the elements 104, that correspond to magnitudes 242, 248 of respective ones of the delays has a direction 254. The direction 254 differs from an axial direction 256 of the array 102 by the plane wave angle 236. Accordingly, the delays 242, 248 are directly proportional to lateral positions 232, 244 of respective ones 230, 246 of the elements. The delays 242, 248 are also functionally dependent upon the plane wave angle 236. For each element 104 of the array 102, a respective delay 242, 248 is applied. It is noted, for generality, however, that the array 102 might be a sub-array of a larger, physical array of ultrasound transducer elements, as suggested by the series of dots 257.

The delays 242, 248 do not focus. This differs from existing delay schemes. In existing schemes, to achieve temporal coherence with respect to a field point, those samples from more laterally distant transducer elements that are more delayed are selected, to geometrically accommodate greater time of flight. The focusing according to what is proposed herein, by contrast, is deferred to the later occurring CS processing.

As in existing beamforming, for generating an imaging sample, delays are applied transducer-element-wise to respective ones of stored time samples and the delayed samples are summed, as represented by the arrows 258, 260, coherently in time according to the delays. However, according to what is proposed herein, the delays 242, 248 utilized in the summing are collectively non-focused not focused on any field point 214, 216 in the medium 210, and not focused in any respect.

Image acquisition can proceed with the plane wave angle 236 at a particular desired, targeted, or otherwise predefined angular value. Thus, beamformed samples 204 are generated progressively by imaging depth to span the image being acquired.

Simultaneously, or immediately subsequently, the beamforming is repeated for an updated plane wave angle. The simultaneous processing can be likened to conventional parallel processing of multiple receive lines. The beamforming here, however, is based on the same acquisition again. There is no new acquisition from the medium 210 for the beamforming that is based on the just-updated plane wave angle. Nor does the beamforming focus.

The range of angles 236, e.g. −45° to 45° or −30° to 30° is represented in FIG. 2 by different ones in a range from $\Theta_1$ to $\Theta_n$. Moving from angle to angle is equivalent to rotating 262 the pattern 252 of deviations or delay magnitudes 242, 248.

The delay schemes usable according to what is proposed herein are not confined to the plane wave based definition $t_i = x_i + \sin(\Theta)/c$.

A generic example of delay for diverging beams would be:

$$\left(\sqrt{(x_i + focal_{depth} * \sin(\theta))^2 + (focal_{depth} * \cos(\theta))^2} - |focal_{depth}|\right)/c,$$

where $focal_{depth}$ is the (negative) focal depth of the diverging beam, i.e., −10 mm, θ is the angle of the diverging beam, and $x_i$ is the azimuth of the transducer element considered (there would be one delay for each transducer element, ranging from 1 to 128 for example). The speed of sound in the medium 210 is c. Here, the focal depth is defined in polar coordinates, with all foci at a constant radius from the probe center. Here, as with plane-wave-angle-based delays 242, 248, the delays do not focus.

Other schemes are possible in which the foci don't lie on a radius, but at a fixed depth for example.

In one possible embodiment, the diverging beams are not rotated, but translated. For example, a subaperture of the whole array can be used for the first beamformed line. The delays correspond to a diverging beam, with an angle equal to 0. Simultaneously, or immediately subsequently, a different, translated sub-aperture is used for a different line, again with delay corresponding to angle 0. An example of delay for such a scheme would be $$(\sqrt{(x_i)^2 + (focal_{depth})^2} - |focal_{depth}|)/c$$

where in that case, $x_i$ is defined for each sub aperture (with respect to the center of the sub-aperture for example). A mixture of translation and rotation could also be implemented.

A second switch 264 has, according to the curved, two-headed, selection arrow 266, one throw choosing either the Hilbert transform processor 118 or the Fourier transform processor 116, and another throw bypassing both processors.

A third switch 268 has, according to the curved, two-headed, selection arrow 270, one throw choosing the Hilbert transform processor 118, and the other throw choosing the Fourier transform processor 116.

The compressive sensing processor 120 is configured for and therefore operable to sparsify the image acquired from the medium 210, resulting in a sparsified image 272. Details on the CS processing are provided further below.

Figure 3A:
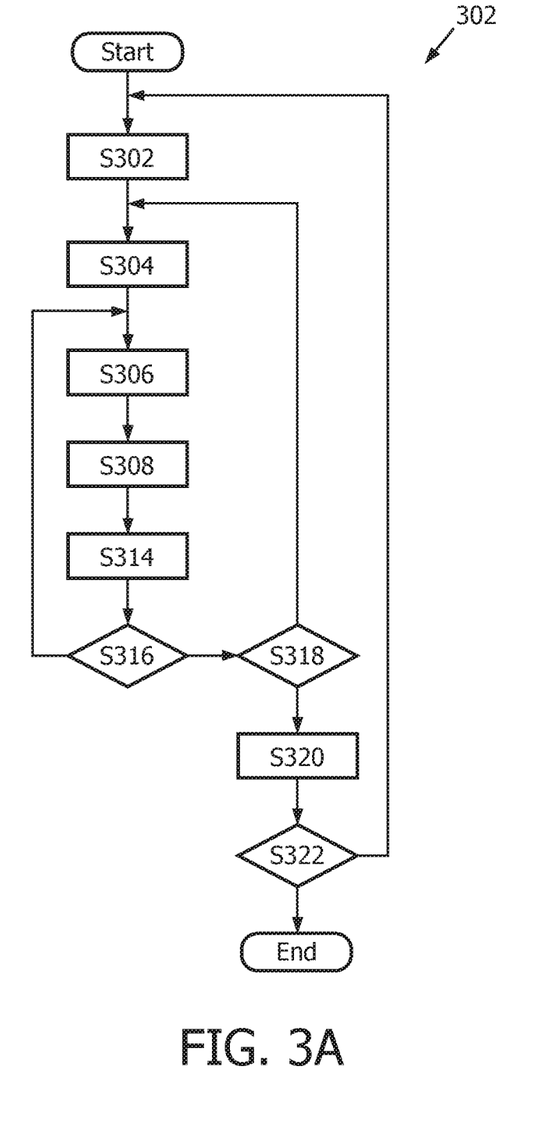
FIGS. 3A-3C are flow charts illustrating possible designs of the operation of the apparatus of FIG. 1, in accordance with the present invention.
Figure 3B:
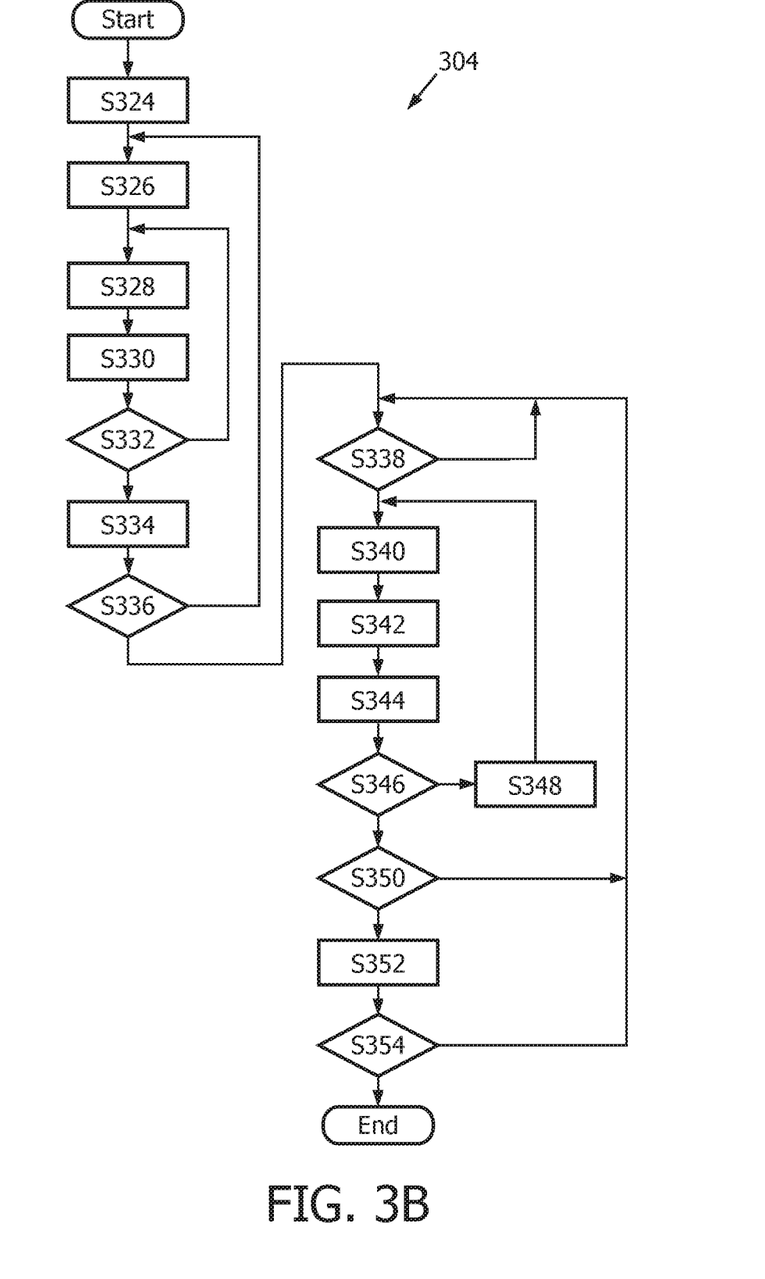
Figure 3C:
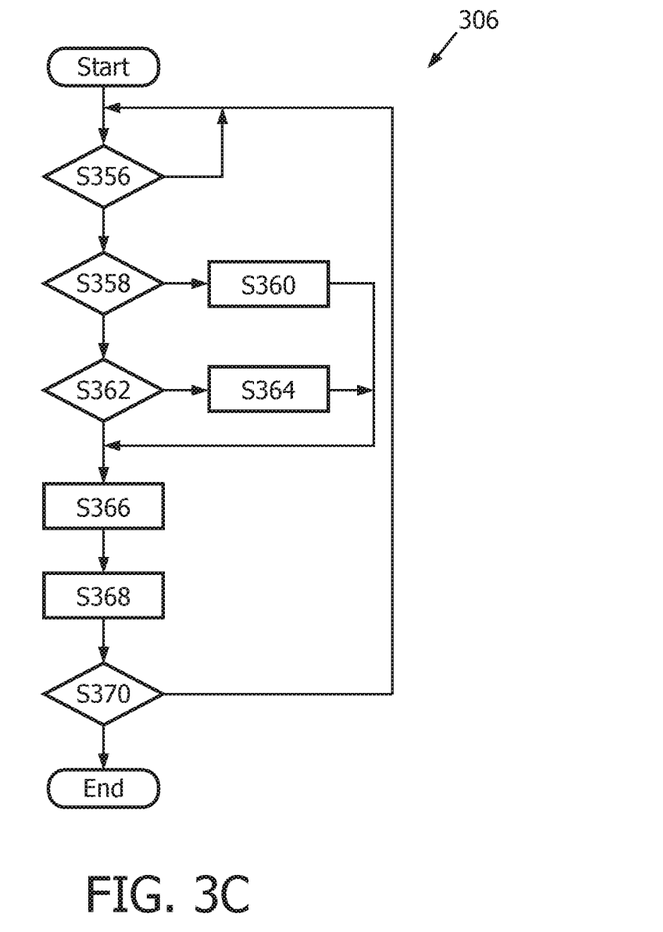

Operationally, three sub-processes can be used. As initial sub-processes, there is a medium-sampling sub-process 302 and a beamforming sub-process 304. There is also a main sub-process 306. The three sub-processes 302-306 may concurrently execute.

In the medium-sampling sub-process 302, the frame buffer 132 is initialized by clearing it (step S302). An unfocused transmit 208 is issued (step S304). The echo is currently sensed by the array 102, thus detecting radiofrequency (RF) data representative of a current imaging depth (step S306). Time samples 202, for each of the transducer elements 104, are created (step S308). The timing of sampling can be built-in or programmed to automatically effect the delays. The time samples are stored (step S314). If sampling is to continue for a next imaging depth (step S316), return is made to the echo sensing step S306. Otherwise, if there is not a next imaging depth to process (step S316), it is checked whether a frame is complete as to time samples (step S318). In some embodiments, merely a single transmit 208 is needed in the imaging of medium 210, resulting in an increase in frame rate. In other embodiments, up to four, or more, transmits 208 may issue before the current image frame is complete, still resulting in fewer transmits than usual and resulting in a higher frame rate. Each transmit 208 may insonify the entire medium being imaged. In between the transmits, sampling occurs typically simultaneously for different plane wave angles and, for each angle, receive beamforming is performed progressively so as to span the image. If the current frame is not complete (step S318), processing returns to the transmit step S304. Otherwise, if the current frame is complete (step S318), it is marked as complete as to time samples (step S320). If a next frame is to be assembled (step S322), processing branches back to the frame buffer initialization step S302. Otherwise, if there is no next frame to be assembled (step S322), processing is complete.

The beamforming sub-process 304 is only used in the event of beamforming being implemented or a mode of operation. The plane wave angle 236 is set to an initial value $\Theta_1$ (step S324). An element counter is initialized to zero (step S326). Delay $t_i = x_i + \sin(\Theta)/c$, where i is the element counter, is associated with the $i^{th}$ element 104 (step S328). The counter is incremented (step S330). If the counter is less than $N_{el}$ (step S332), the number of elements 104, return is made to the delay associating step S328. On the other hand, if the counter has attained $N_{el}$ (step S332), beamforming has now been initialized for the current plane wave angle 236. The angle 236 is incremented so that $\Theta_i = \Theta_i + \Delta$ (step S334). The angles 236 here are regularly spaced but need not be. It is checked whether $\Theta_i$ exceeds $\Theta_n$ (step S336). If $\Theta_n$ is not exceeded (step S336), return is made to the element counter initialization step S326. Otherwise, if $\Theta_n$ is exceeded (step S336), beamforming has now been initialized for all plane wave angles 236. There may be, for example, 16, 32, or 64 different plane wave angles 236 altogether. When samples stored in step S314 are available for processing (step S338), the delays 242, 248 are applied in selecting from the stored samples (step S340). Via parallel processing, a set of delays 242, 248 is applied concurrently for each plane wave angle 236 in the range. The selected, i.e., delayed, samples are summed coherently in time to yield one beamformed sample for each angle 236 (step S342). The sums, i.e., beamformed samples, are stored (step S344). If imaging depth, or equivalently the base time, is to be incremented (step S346), it is incremented (step S348) and return is made to the delay applying step S340. Otherwise, if there is no next depth to be processed (S346), it is checked whether another transmit 208 is to issue for the current frame (step S350). If another transmit 208 is to issue (step S350), return is made to the sample available checking step S338. Otherwise, if the frame is complete (step S350), it is marked as complete as to unfocused beamformed samples (step S352). If processing is to continue (step S354), it branches back to the sample available checking step S338. Also, as mentioned above, beamforming for the different plane wave angles 236 may be serial rather than simultaneous.

In the main sub-process 306, when a frame, containing time sample or beamformed data, is available (step S356), query is made as to whether a Fourier transform is to be performed (step S358). If a Fourier transform is to be performed (step S358), the Fourier transform processor 116 receives the current frame (step S360). If, on the other hand, a Fourier transform is not to be performed (step S358), query is made as to whether a Hilbert transform is to be performed (step S362). If a Hilbert transform is to be performed (step S362), the Hilbert transform processor 118 receives the current frame (step S364). In any event, the frame data, transformed or not, is received by the CS processor 120 (step S366). The outputted sparsified image is stored (step S368), as for subsequent review by a clinician such as a physician. If a next sparsified image is to be derived (step S370), return is made to step S356 to see if a frame is available or to await a frame. Alternatively to the processing flow shown above, the data that has undergone the Hilbert transform may then be subject to a Fourier transform before CS.

FIGS. 4A-4F provide details on the CS processing.

The image-to-measurement-basis transformation matrix M, by itself, provides a transformation from the pixel basis to the measurement basis when the pixel basis is the compression basis. The image is represented in the compression basis by the matrix X which is the representation of the image to be sparsified, or being sparsified. The image in the measurement basis is represented by matrix Y.

When the pixel basis is other than the compression basis, such as when, as mentioned further herein above, a more complex compression basis is utilized, an image representation dictionary matrix V is usable in a composite transformation MV. The composite transformation MV, as in the above case of M alone, operates on matrix X, the result likewise being in the measurement basis.

Figure 4A:
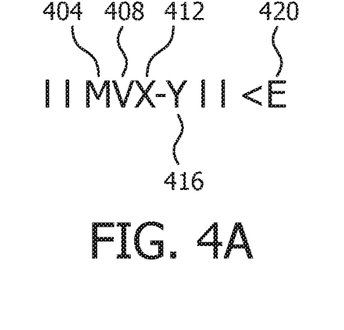
FIGS. 4A-4F are mathematical expressions representative of and used in calculations performable in versions of the present invention.

In sparsifying an image acquired from the medium 210, a first norm of ψX is to be minimized subject to a constraint. Matrix ψ may be designed for applying weights to X and can be a diagonal matrix of weights which, in the case of no weighting, defaults to the identity matrix. Matrix ψX accordingly is a product of two matrices the content of one, i.e., X, representing the image in a compression basis. The first norm can be the 1-norm or another p-norm. The minimization is to be performed subject to the constraint that a second p-norm, such as the 2-norm, of MVX-Y be less than an allowed-error threshold E. The constraint is shown in FIG. 4A. In FIG. 4A, the matrices M, V, X and Y are denoted by reference numerals 404, 408, 412, and 416, respectively, and the allowed-error threshold is denoted by reference numeral 420. The matrix V is formed, for a basis more complex than the pixel basis, based on any of, or any combination of, wavelets, curvelets, wave atoms, Laplacians, etc. Or it may be formed by a dictionary learned by K-SVD. Examples of such learning are disclosed in the '199 publication. Matrix V may likewise default to the identity matrix, if CS processing is to operate on pixel basis image data. Any reference to matrix V or matrix ψ in this disclosure may refer, by default, to the identity matrix, unless otherwise indicated. Iterative minimization of X subject to the above constraint, ∥MVX-Y∥<E where ∥ ∥ is the 2-norm, is a well-known convex optimization problem used in sparsifying data. Minimization algorithms include, but are not limited to, matching pursuit (MP), orthogonal matching pursuit (OMP), basic pursuit denoising (BPDN), and the interior points method. See "the '199 publication", paragraphs [0003]-[0010]; see also U.S. Patent Publication Nos. 2014/0140375, FIG. 2 and accompanying text in the specification; 2011/0273320, paragraphs [0106]-[0111]; and 20110182353, paragraphs [0015]-[0016]. The noted disclosure of each of these publication is incorporated herein by reference.

The matrix X has a single column, and row for each pixel. The number of columns of matrix M is accordingly always equal to the number of pixels, e.g., 512×512=$2^{18}$, and Y is likewise a single column matrix. In the case of the non-default version of the image representation dictionary matrix 408, such that the image is CS processed in other than the pixel basis, the dimension of X may be more than the number of pixels in the event the basis defined by V is redundant.

One of the dimensions of M and of Y varies depending on the type of image data being processed. The dimension is provided by two multiplicative factors representing parameters pertaining to the type of data. One of the factors also depends upon whether the imaging in planar or volumetric. Here, for simplicity of demonstration, a planar image is assumed, but M could have for example 512×512×512=$2^{27}$ columns when reconstructing a volumetric, i.e., three-dimensional, image.

FIGS. 4B-4F are the $M_{ijkl}$ entries for respective types of data. The term "channel data" is used here to refer to the raw, radiofrequency time samples 202, a stream of which is symbolized by "TS" in FIG. 2.

Figure 4B:
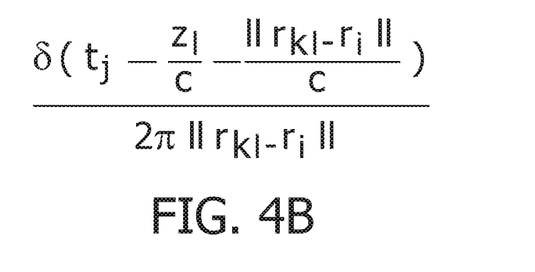

In a first case, seen in FIG. 4B, channel data flows directly to the CS processor 120, without Fourier or Hilbert transformation. The number of rows of Y, and equivalently of M, is equal to the number $N_{el}$ of transducer elements 104 times the number of time samples $N_t$ per element in measuring an echo, i.e., traversing the medium 210. For $M_{ijkl}$, the mathematical expression is shown in FIG. 4B. The symbol $t_j$ is the time sample at the $i^{th}$ transducer element 104; $r_i$ is the lateral position vector (relating to the lateral position 232) of the $i^{th}$ transducer element; $r_{kl}$ is the position vector of the point scatterer in the field, k being a lateral index and l being an axial index (i.e., index of imaging depth)—it is noted that each column of M will be indexed by a value of k and by a value of l, corresponding to the pixel kl in the image; ∥ ∥ denote "magnitude of"; $z_1$ is the imaging depth, or axial distance, of the point scatterer with l being an index of the depth; δ is the Dirac delta function; and "c" is the speed of sound in the medium 210. $M_{ijkl}$ does not need to be specified by a mathematical formula; it could be obtained from a simulation. It corresponds in the present example to the value of the wavefront sample, received by transducer i, at time $t_j$, for a point like scatterer located at the pixel kl after insonification by a plane wave.

With slight modification, a formula for diverging beams can be derived from FIG. 4B:

$$\frac{\delta\left(t_j - \frac{z_k}{c} - \frac{(\|r_{kl} - r_i\| - \|r_i\|)}{c}\right)}{2\pi \| r_{kl} - r_i \|}$$

where $r_i$ now refers to the position of the diverging beam focal point, and i is the index of the diverging beam. The additional term—$\|r_i\|$ relates to a choice for the origin of time. If different conventions are chosen, this term could be different.

Figure 4C:
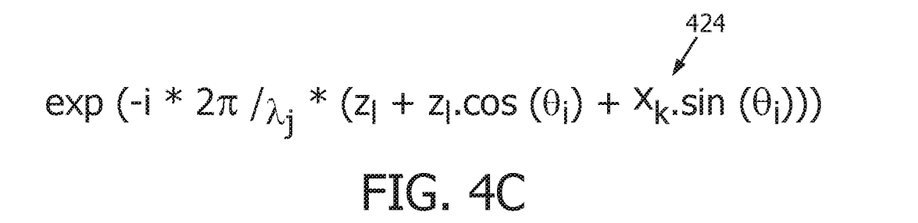

FIG. 4C relates to unfocused beamformed samples (in the plane wave on receive case) that have undergone a Fourier transform. The symbol $x_k$ is the lateral distance, or azimuthal distance, of the point scatterer with k being an index of the lateral distance. The index i denotes the plane wave angle 236. The Y matrix still has a single column, but the number of rows is equal to the number of receive lines times the number of frequency samples per receive line.

As seen from the discussion herein above, matrix Y is populated by beamformed samples. The samples are formed based on the plane wave angle 236. Thus, matrix Y is also based on the plane wave angle 236. In turn, CS which is based on matrix Y is likewise based on the plane wave angle 236. However, CS is based on the plane wave angles 236 not merely via the beamformed samples, but more directly via the matrix M entries 424, 428 which depend on the plane wave angle 236, denoted in FIG. 4D as the angle $\Theta_i$. Accordingly, sparsifying performed by the CS processor 120 is based on imaging samples generated and, otherwise than merely via the imaging samples, on angles upon which respectively the delays for the generating of the imaging samples are functionally dependent.

The formula for diverging beams on receive, after Fourier transform, is given by $$\frac{\exp(-i * 2\pi/\lambda_j * (z_k + (\|rkl - ri\| - \|r_i\|)))}{2\pi\|rkl - ri\|}$$

where $r_i$ refers to the focal point of the diverging beam i. Again, a term can be added to set the time reference (which becomes a phase in the Fourier domain).

Figure 4D:
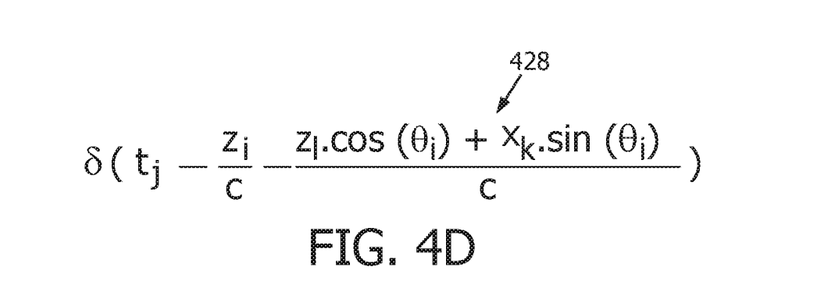

FIG. 4D relates to unfocused beamformed samples 204 that have not undergone any Fourier or Hilbert transformation. The Y matrix still has a single column, but the number of rows is equal to the number of receive lines times the number of beamforming samples per receive line.

Figure 4E:
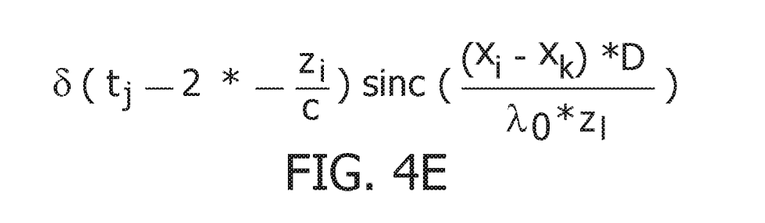

FIG. 4E relates to focused beamformed samples. The symbol "sinc" is the cardinal sinc function, $\lambda_0$ is the wavelength at central frequency of the signal, D is the size of the receive aperture (which can itself be a function of depth $z_1$), $x_i$ is the azimuth of the focused receive line of index i, and $x_k$ is the azimuth of the pixel.

Figure 4F:
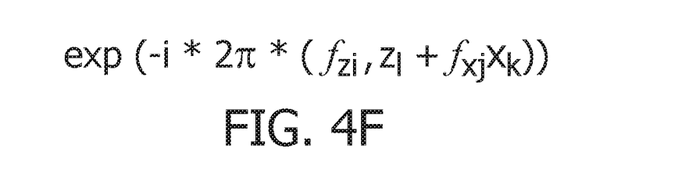

FIG. 4F relates to 2D Fourier implementation that entails focused beamforming. In particular, responsive to the RF data returning from an unfocused transmit, the channel data is dynamically focused in receive, along different receive line directions, with each direction corresponding to a multiline, as is commonly done in multiline beamforming. The beamformed data is represented in FIG. 2 as flowing through an access point 274 to a third throw of the first switch 226. In general, a large number of receive lines, such as 128, would be formed to span the image. This could be done concurrently, or several transmissions may be issued to acquire all of the receive lines. The beamformed samples are operated upon by the Fourier transform processor 116 configured for applying a 2D Fourier transform to the samples. The symbol $f_{z_i}$ is the axial frequency (this is linked to temporal frequency since after beamforming the time dimension is linked to the depth of the image) and $f_{x_j}$ is the lateral frequency. Indices i and j both identify frequency samples (axial and lateral). Flow of processing may also follow the other paths available via respective throws of the switches 264, 268 in FIG. 2, including the HT to FT option.

For all of the above cases, the additional application of the Hilbert transform requires that $M_{ijkl}$ as shown in FIG. 4B-4F be convolved by the Hilbert transform of the Gaussian pulse. A formula for the Gaussian pulse is $g(t)=\sin(2\cdot\pi\cdot f0\cdot t)*\exp(-t^2/\sigma^2)$, where f0 is the central frequency of the wavefront, and $\sigma$ is a measure (variance) of the pulse width. The Hilbert transform of the Gaussian pulse is $e^{-i2\pi f_0 t}e^{-t^2/\sigma^2}$. In FIG. 4B, for example, convolution of the Hilbert Transform with the $M_{ijkl}$ entry shown yields:

$$\frac{e^{-i2\pi f_0\left(t_j-\frac{z_k}{c}-\frac{\|r_{kl}-r_i\|}{c}\right)}e^{-\frac{\left(t_j-\frac{z_k}{c}-\frac{\|r_{kl}-r_i\|}{c}\right)^2}{\sigma^2}}}{2\pi\|r_{kl}-r_i\|}.$$

For any of FIGS. 4B-4F, to make $M_{ijkl}$ more accurate, terms can be added modelling transducer bandwidth and directivity. For modelling bandwidth, this could be done, even in the simple case of no Hilbert Transform, by convolution of $M_{ijkl}$ with the Gaussian pulse. The directivity can be determined by simulating the field generated by the transducer, or by measuring this field. In the case of a plane wave, diverging beam, or other focused or unfocused beams, the directivity of the beam itself could be considered. For example, $M_{ijkl}$ can incorporate a weight proportional to the intensity of the beam at each pixel. The intensity could be obtained from simulation, from a geometrical model of the beam propagation, or from measurements.

In an image compressing ultrasound system, for generating an imaging sample, delays are applied transducer-element-wise to respective ones of stored samples. The delayed samples are summed coherently in time, the coherently summed delays being collectively non-focused. Image compression is performed based on imaging samples and, otherwise than merely via the imaging samples, on angles upon which respectively the delays for the generating of the imaging samples are functionally dependent. In another aspect, an image-compressing processor minimizes a first p-norm of a first matrix which is a product of two matrices the content of one representing the image in a compression basis. The minimizing is subject to a constraint that a second p-norm of a difference between a measurement matrix and a product of an image-to-measurement-basis transformation matrix, an image representation dictionary matrix, and the matrix representing the image in the compression basis does not exceed an allowed-error threshold. The measurement matrix is populated either by channel data, or by output of a Hilbert transform applied to the channel data in a time dimension. Here, p is different or the same for the first and second p-norms.

While the invention has been illustrated and described in detail in the drawings and foregoing description, such illustration and description are to be considered illustrative or exemplary and not restrictive; the invention is not limited to the disclosed embodiments.

For example, a discrete cosine transform (DCT) basis may be used as the compression basis.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The word "exemplary" is used herein to mean "serving as an example, instance or illustration." Any embodiment described as "exemplary" is not necessarily to be construed as preferred or advantageous over other embodiments and/or to exclude the incorporation of features from other embodiments. Any reference signs in the claims should not be construed as limiting the scope.

A computer program can be stored momentarily, temporarily or for a longer period of time on a suitable computer-readable medium, such as an optical storage medium or a solid-state medium. Such a medium is non-transitory only in the sense of not being a transitory, propagating signal, but includes other forms of computer-readable media such as register memory, processor cache and RAM.

A single processor or other unit may fulfill the functions of several items recited in the claims. The mere fact that certain measures are recited in mutually different dependent claims does not indicate that a combination of these measures cannot be used to advantage.

What is claimed is:

1. An ultrasound imaging apparatus comprising:
    image-sample-acquisition circuitry operable to apply delays on signals from transducer elements, wherein the signals are generated by the transducer elements responsive to echoes received by the transducer elements, the echoes responsive to a transmit pulse, and sum the signals coherently in time according to said delays to generate imaging samples, wherein the delays utilized in the summing are such that the imaging samples are unfocused; and
    a compressive sensing processor operable to sparsify an ultrasound image comprising the imaging samples, wherein sparsifying is based on angles upon which respective ones of the delays for the generating of said imaging samples are functionally dependent, wherein to sparsify the ultrasound image, the compressive sensing processor is configured to apply a transformation matrix to the imaging samples, wherein the transformation matrix is based, at least in part, on the angles and the transformation matrix provides a transformation from a pixel basis to a measurement basis when the pixel basis is a compression basis.

2. The apparatus of claim 1, said processor being configured to find a sparsest image that does not exceed an allowed-error threshold corresponding to said imaging samples.

3. The apparatus of claim 1, further comprising an ultrasound transducer array operable to acquire the ultrasound image, and wherein said compressive processor is operable to minimize a first p-norm of a first matrix which is a product of two matrices.

4. The apparatus of claim 1, wherein said delays are directly proportional to lateral positions of said transducer elements in an ultrasound transducer array.

5. The apparatus of claim 4, wherein said array comprises an axial direction and a lateral direction being perpendicular to said axial direction.

6. The apparatus of claim 1, wherein said circuitry comprises an adder configured to sum the signals by adding a delayed sample for each of said transducer elements.

7. The apparatus of claim 6, wherein the adding comprises using a spatial pattern of deviations corresponding to magnitudes of respective delays for generating said imaging samples.

8. The apparatus of claim 1, further comprising a transducer probe configured to repeatedly alternate between issuing at least four (4) transmits and at least 32 different spatial patterns having respectively different directions.

9. The apparatus of claim 1, further comprising a transducer probe configured to transmit an unfocused ultrasound beam.

10. The apparatus of claim 9, wherein unfocused ultrasound beam comprises at most three transmit ultrasound beams.

11. The apparatus of claim 1, wherein said ultrasound image is generated from time samples to be stored as stored time samples used in the generating of said imaging samples.

12. The apparatus of claim 1, said processor being further configured to apply compressive sensing that focuses on field points defined by said compressing sensing.

13. The apparatus of claim 1, wherein said compressive sensing processor is configured to read entries of a compression-to-measurement-basis transformation matrix that are based on angles associated with the imaging samples.

14. The apparatus of claim 1, further comprising a Fourier transform processor being operable to apply a Fourier transform to the imaging samples, and wherein said compressive sensing processor is configured to operate on the imaging samples transformed by the Fourier transform.

15. The apparatus of claim 1, further comprising a Hilbert transform processor operable to apply a Hilbert transform to the imaging samples, and wherein said compressive sensing processor is configured to operate on the imaging samples transformed by the Hilbert transform.

16. The apparatus of claim 1, wherein the angles are plane wave angles.

17. The apparatus of claim 1, wherein the angles are diverging beam angles.

18. The apparatus of claim 1, wherein the angles comprise angles of incidence of the echoes on the transducer elements.

19. The apparatus of claim 18, wherein the delays to generate the imaging samples are configured to remove the angles of incidence of the echoes.

* * * * *